(12) United States Patent
Nomura et al.

(10) Patent No.: US 8,794,716 B2
(45) Date of Patent: Aug. 5, 2014

(54) BRAKE FLUID PRESSURE CONTROL APPARATUS FOR VEHICLE

(75) Inventors: Nobuyuki Nomura, Nagano (JP); Ryoji Mori, Saitama (JP)

(73) Assignees: Nissin Kogyo Co., Ltd., Nagano (JP); Honda Motor Co., Ltd., Tokyo (JP)

( * ) Notice: Subject to any disclaimer, the term of this patent is extended or adjusted under 35 U.S.C. 154(b) by 742 days.

(21) Appl. No.: 12/146,833

(22) Filed: Jun. 26, 2008

(65) Prior Publication Data

US 2009/0001807 A1  Jan. 1, 2009

(30) Foreign Application Priority Data

Jun. 29, 2007 (JP) .................................. 2007-173093

(51) Int. Cl.
*B60T 13/18* (2006.01)
*B60T 13/00* (2006.01)
*B60T 8/66* (2006.01)

(52) U.S. Cl.
USPC ................................ 303/20; 303/11; 303/162

(58) Field of Classification Search
USPC .............. 303/10, 11, 20, 115.2, 115.4, 119.1, 303/119.2, 154–162, 116.1
See application file for complete search history.

(56) References Cited

U.S. PATENT DOCUMENTS

| | | | | |
|---|---|---|---|---|
| 6,113,197 A * | 9/2000 | Kuroki et al. | .................. | 303/11 |
| 6,192,307 B1 * | 2/2001 | Okamoto et al. | ............... | 701/70 |
| 6,913,326 B1 * | 7/2005 | Ohkubo et al. | ................. | 303/11 |
| 2001/0005100 A1 * | 6/2001 | Kamiya | ............................ | 303/5 |
| 2007/0018497 A1 | 1/2007 | Nomura et al. | | |
| 2007/0024115 A1 | 2/2007 | Nomura et al. | | |
| 2007/0252428 A1 * | 11/2007 | Okano et al. | ............... | 303/113.1 |

FOREIGN PATENT DOCUMENTS

JP  2000-203401  7/2000

OTHER PUBLICATIONS

European Search Report for Application No. 08252210.3, dated Oct. 7, 2011.

* cited by examiner

*Primary Examiner* — Bradley King
*Assistant Examiner* — Vishal Sahni
(74) *Attorney, Agent, or Firm* — Nelson Mullins Riley & Scarborough LLP; Anthony A. Laurentano

(57) ABSTRACT

Brake fluid pressure control apparatus includes: fluid pressure passage from a fluid pressure source to a wheel brake; pressure regulating valve arranged on the passage; pump for feeding pressurized brake fluid to the passage between the valve and the wheel brake; motor for driving the pump; and controller which controls an electric current applied to the valve in accordance with target fluid pressure for the wheel brake to control fluid pressure supplied to the wheel brake. The controller includes: means for converting the target fluid pressure into fluid volume and calculating required flow rate from this fluid volume; means for calculating required rotation speed of the motor from the required flow rate and on the basis of efficiency of the pump; and means for increasing the electric current applied to the valve for a predetermined value when the required rotation speed exceeds actual rotation speed of the motor.

16 Claims, 9 Drawing Sheets

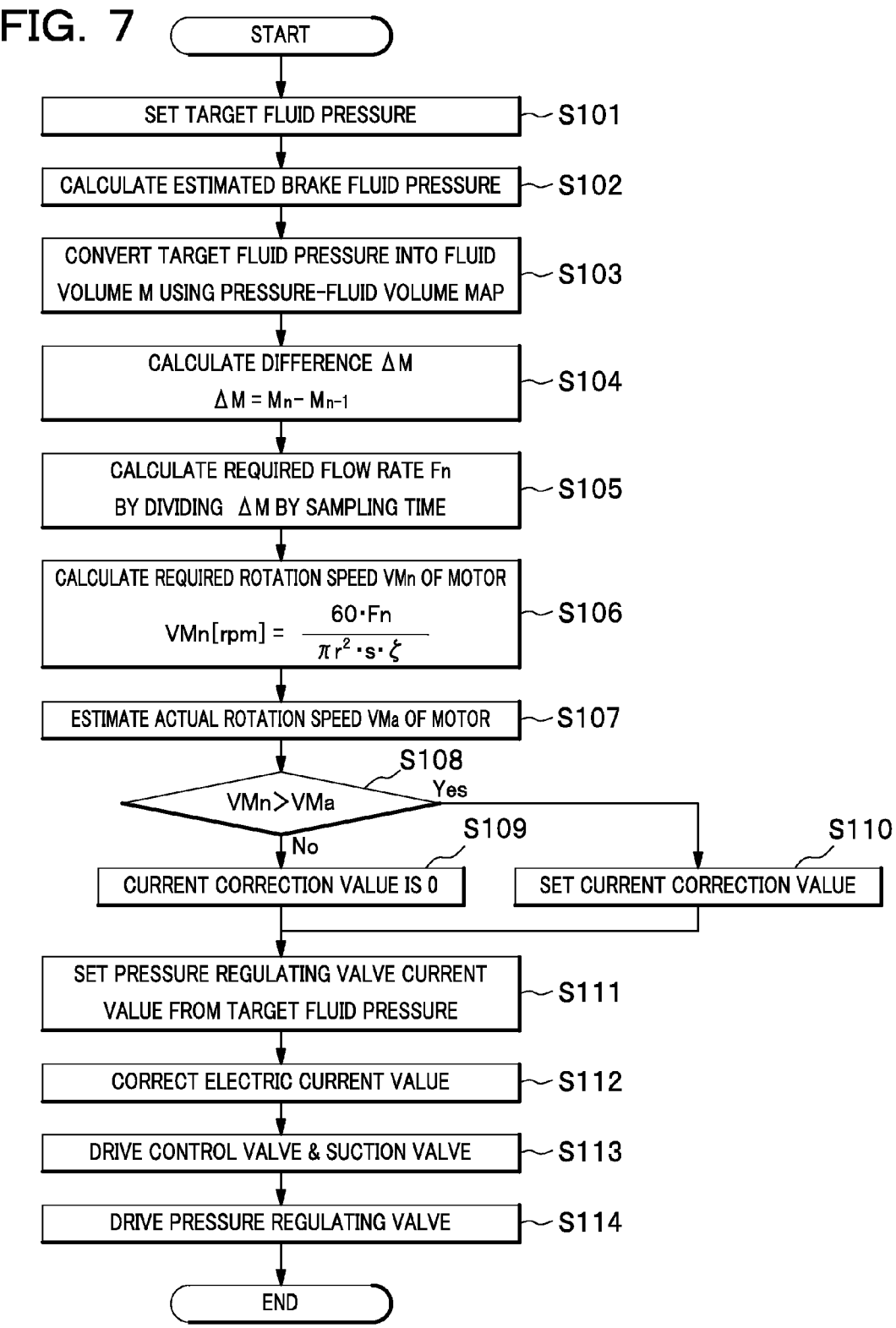

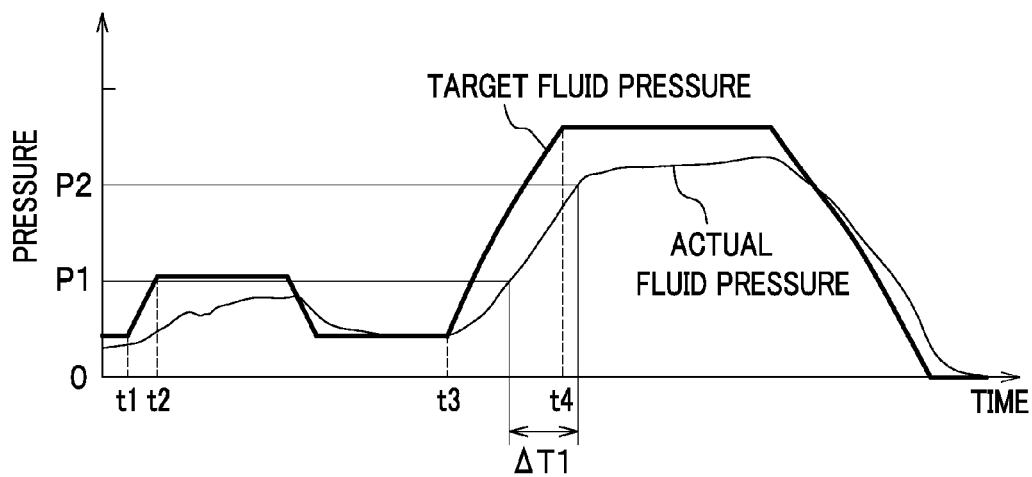
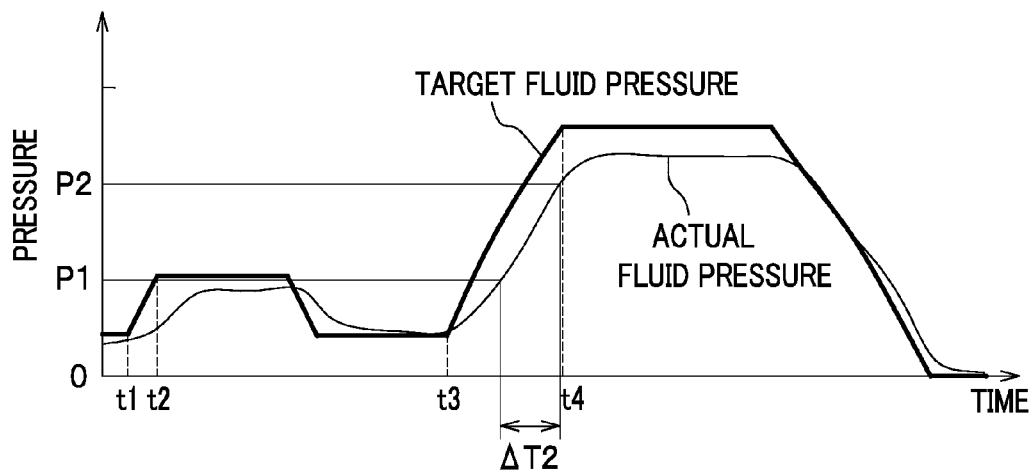

BRAKE FLUID PRESSURE CONTROL APPARATUS FOR VEHICLE

CROSS REFERENCE TO RELATED APPLICATIONS

This application claims the foreign priority benefit under Title 35, United States Code, §119(a)-(d) of Japanese Patent Application No. 2007-173093 filed on Jun. 29, 2007 in the Japan Patent Office, the disclosure of which is herein incorporated by reference in its entirety.

BACKGROUND OF THE INVENTION

The present invention relates to a brake fluid pressure control apparatus for a vehicle, and more particularly to a brake fluid pressure control apparatus for a vehicle, which is capable of increasing brake fluid pressure applied to wheel brakes through a pump.

In recent years, there has been proposed a brake fluid pressure control apparatus for a vehicle including an electric pump for supplying pressurized brake fluid to wheel brakes so that a braking force is proactively and automatically generated without requiring a brake pedal operation of the driver. Such a brake fluid pressure control apparatus generates a braking force to realize a collision mitigation brake system or a vehicle stability assist system.

For example, Japanese Laid-open Patent publication No. 2000-203401 discloses a brake control apparatus for a vehicle in which pumps and pressure regulating valves (shut-off valves) are used for controlling fluid pressure in wheel brakes. The pressure regulating valves are of a linear solenoid-type valve which can restrict flows of brake fluid from wheel brakes to the master cylinder with a pressure (valve closing force) according to an electric current applied to the valve.

However, in the case of the collision mitigation brake system where the target fluid pressure is gently increased at a slight inclination, the initial valve closing force of the pressure regulating valve is weaker when compared with the discharge pressure of the pump if an electric current in accordance with the target fluid pressure is applied to the pressure regulating valve. This is because the valve closing force of the pressure regulating valve increases gradually as with the target fluid pressure, and a weak valve closing force will be provided at an initial stage of the increase in the fluid pressure. This will cause a slight amount of brake fluid to flow through the pressure regulating valve toward the master cylinder, and hence the efficiency of increase in fluid pressure deteriorates accordingly.

In view of the foregoing drawback, the present invention seeks to provide a brake fluid pressure control apparatus for a vehicle, which is capable of quickly pressurizing fluid in a fluid pressure passage between the pressure regulating valve and the wheel brake so that the actual fluid pressure at the wheel brake comes closer to the target fluid pressure.

SUMMARY OF THE INVENTION

According to the present invention, there is provided a brake fluid pressure control apparatus for a vehicle comprising: a fluid pressure passage extending from a fluid pressure source to a wheel brake; a pressure regulating valve arranged on the fluid pressure passage, the pressure regulating valve allowing a flow of brake fluid from the fluid pressure source to the wheel brake while restricting a flow of brake fluid from the wheel brake to the fluid pressure source with a valve closing force according to an electric current applied to the valve; a pump for feeding pressurized brake fluid to the fluid pressure passage between the pressure regulating valve and the wheel brake; a motor for driving the pump; and a controller which controls the electric current applied to the pressure regulating valve in accordance with a target fluid pressure for the wheel brake to control fluid pressure supplied to the wheel brake. In this brake fluid pressure control apparatus, the controller comprises: means for converting the target fluid pressure into fluid volume and calculating a required flow rate based on this fluid volume; means for calculating a required rotation speed of the motor based on the required flow rate and on the basis of an efficiency of the pump; and means for increasing the electric current applied to the pressure regulating valve for a predetermined value when the required rotation speed exceeds an actual rotation speed of the motor obtained through detection or estimation.

In a preferred embodiment, a required flow rate calculation unit may be the means for converting the target fluid pressure into fluid volume and calculating a required flow rate based on this fluid volume; a required rotation speed calculation unit may be the means for calculating a required rotation speed of the motor based on the required flow rate and on the basis of an efficiency of the pump; and an electric current value determination unit may be the means for increasing the electric current applied to the pressure regulating valve for a predetermined value when the required rotation speed of the motor exceeds an actual rotation speed of the motor obtained through detection or estimation.

With this construction of the brake fluid pressure control apparatus, the required rotation speed of the motor is calculated from the target fluid pressure. However, when the required rotation speed of the motor exceeds the actual rotation speed of the motor, there may be a greater difference between the target fluid pressure and the actual fluid pressure at the wheel brake, and a large amount of fluid pressure may be required for the wheel brake. In this instance, the pressure regulating valve is not controlled in accordance with the target fluid pressure. Instead, even if the target fluid pressure is low at the initial stage of the increase in fluid pressure, an increased electric current (for a predetermined value) is applied to the pressure regulating valve to prevent a leakage of brake fluid from the pressure regulating valve toward the fluid pressure source. Therefore, it is possible to quickly pressurize the brake fluid within the fluid passage between the pressure regulating valve and the wheel brake so as to conform to the target fluid pressure.

In the aforementioned brake fluid pressure control apparatus, the controller may set the predetermined value to a greater value as a difference between the actual rotation speed and the required rotation speed is greater.

In the case where an electric current applied to the pressure regulating valve is increased for the predetermined value only on the basis of the magnitude relation between the actual rotation speed and the required rotation speed of the motor, the applied electric current will be controlled on an on/off basis such that the predetermined value will be increased when the actual rotation speed of the motor is smaller than the required rotation speed of the motor, whereas the predetermined value will not be increased when the actual rotation speed of the motor is greater than the required rotation speed of the motor. This control may provide a sufficient performance on the brake fluid pressure control apparatus as long as the pressure regulating valve and other constituent parts are manufactured with a high degree of accuracy. However, in an actual braking system employing such a brake fluid pressure control apparatus, there is a greater tendency to cause a time lag for increasing the electric current due to variation of the constituent parts. For this reason, it is advantageous if the predetermined value is sequentially changed based on the magnitude of the difference between the actual rotation speed and the required rotation speed of the motor. This is because when the magnitude of the difference is great, it is ensured that the wheel brake requires a large amount of brake fluid, and therefore the predetermined value which is an increased electric current applied to the pressure regulating valve may be increased accordingly. Meanwhile, when the magnitude of the difference is small, the predetermined value may be set as a small value so that even a time lag derived from variation of the constituent parts does not affect so much on the performance and the two conditions, that is, with or without increasing the applied electric current will be continuously switched over to realize a smooth pressure regulation.

According to the present invention, brake fluid is less likely to flow from the wheel brake to the fluid pressure source through the pressure regulating valve even if the target fluid pressure gently increases at a slight inclination. Therefore, the brake fluid pressure control apparatus quickly pressurizes the brake fluid at the wheel brake, and consequently the actual fluid pressure at the wheel brake comes closer to the target fluid pressure.

BRIEF DESCRIPTION OF THE DRAWINGS

Other objects and aspects of the present invention will become more apparent by describing in detail illustrative, non-limiting embodiments thereof with reference to the accompanying drawings, in which:

FIG. 7 is a flow chart explaining the operation of the brake fluid pressure control apparatus;

FIGS. 8A and 8B are time charts explaining reference examples, in which FIG. 8A shows an example where the motor is PWM controlled at 100% duty cycle without correcting electric current, and FIG. 8B shows an example where the motor is PWM controlled at a duty cycle lower than 100% without correcting electric current.

DETAILED DESCRIPTION OF THE INVENTION

With reference to the attached drawings, a preferred embodiment of the present invention will be described.

Figure 1:
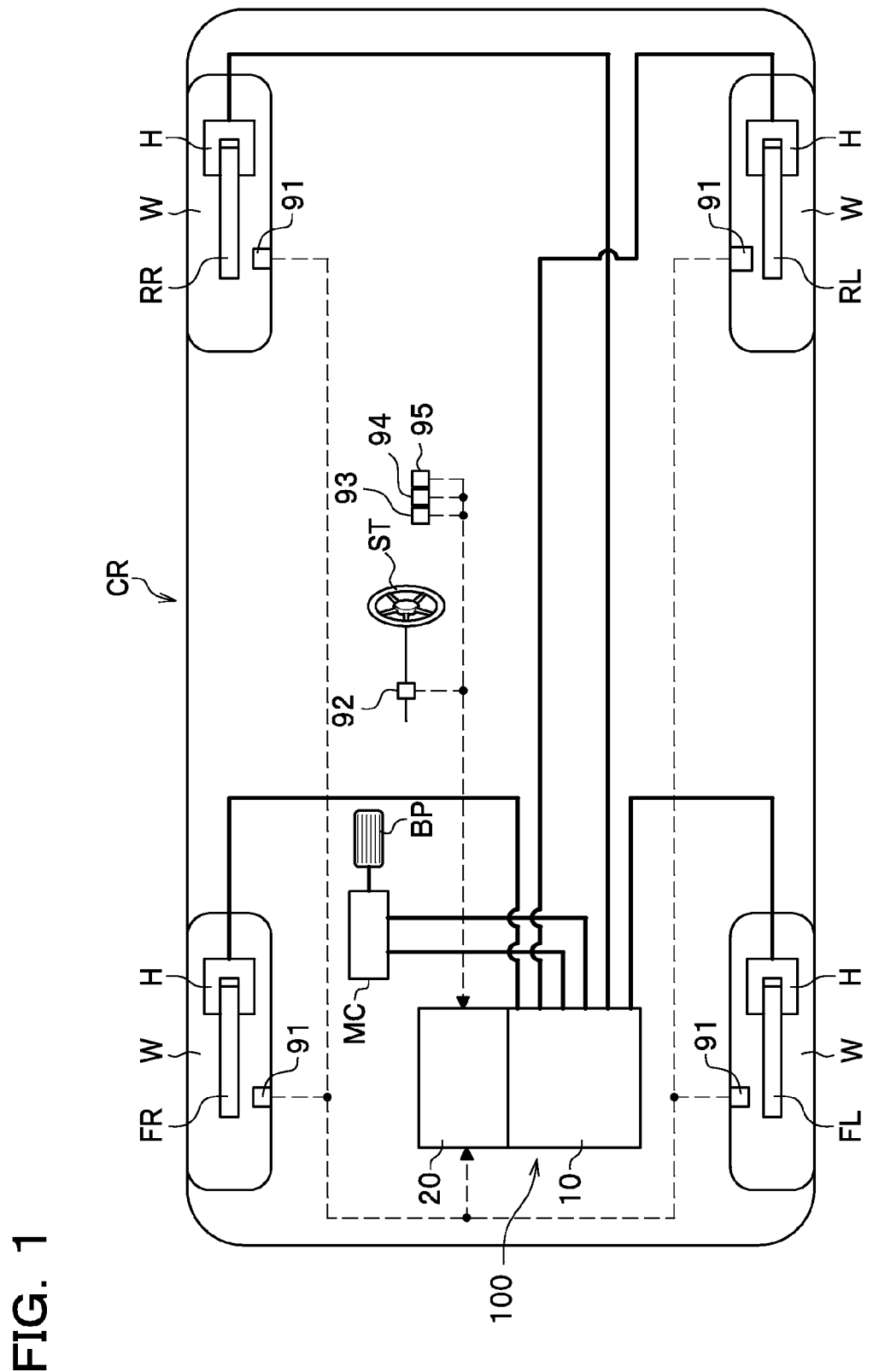
FIG. 1 is a block diagram of a vehicle in which a brake fluid pressure control apparatus according to one embodiment of the present invention is installed.

As seen in FIG. 1, a brake fluid pressure control apparatus 100 for a vehicle CR controls a braking force (brake fluid pressure) applied to each wheel W of the vehicle CR where appropriate. The brake fluid pressure control apparatus 100 mainly consists of a fluid pressure unit 10 in which brake fluid passages (fluid pressure passages) and various parts are provided, and a controller 20 for appropriately controlling the various parts within the fluid pressure unit 10. Connected to the controller 20 of the brake fluid pressure control apparatus 100 are wheel speed sensors 91 each for detecting wheel speed of a wheel W, a steering angle sensor 92 for detecting a steering angle of a steering wheel ST, a lateral acceleration sensor 93 for detecting an acceleration in a lateral direction of the vehicle CR, a yaw rate sensor 94 for detecting angular velocity at which the vehicle CR is rotated about its vertical axis, and an acceleration sensor 95 for detecting an acceleration of the vehicle CR in the front-back direction. These sensors 91-95 output detection signals to the controller 20.

The controller 20 includes a CPU, a RAM, a ROM, an input/output circuit, etc. The controller 20 performs various arithmetic processing operations based on input signals from the wheel speed sensors 91, the steering angle sensor 92, the lateral acceleration sensor 93, the yaw rate sensor 94, and the acceleration sensor 95, and also based on programs or data stored in the ROM, so as to execute the control. A wheel cylinder H is a hydraulic device which converts brake fluid pressure generated at a master cylinder MC and the brake fluid pressure control apparatus 100 into actuating force for a wheel brake FR, FL, RR, RL of each wheel W. In this preferred embodiment, four wheel cylinders H are connected to the fluid pressure unit 10 of the brake fluid pressure control apparatus 100 through piping.

Figure 2:
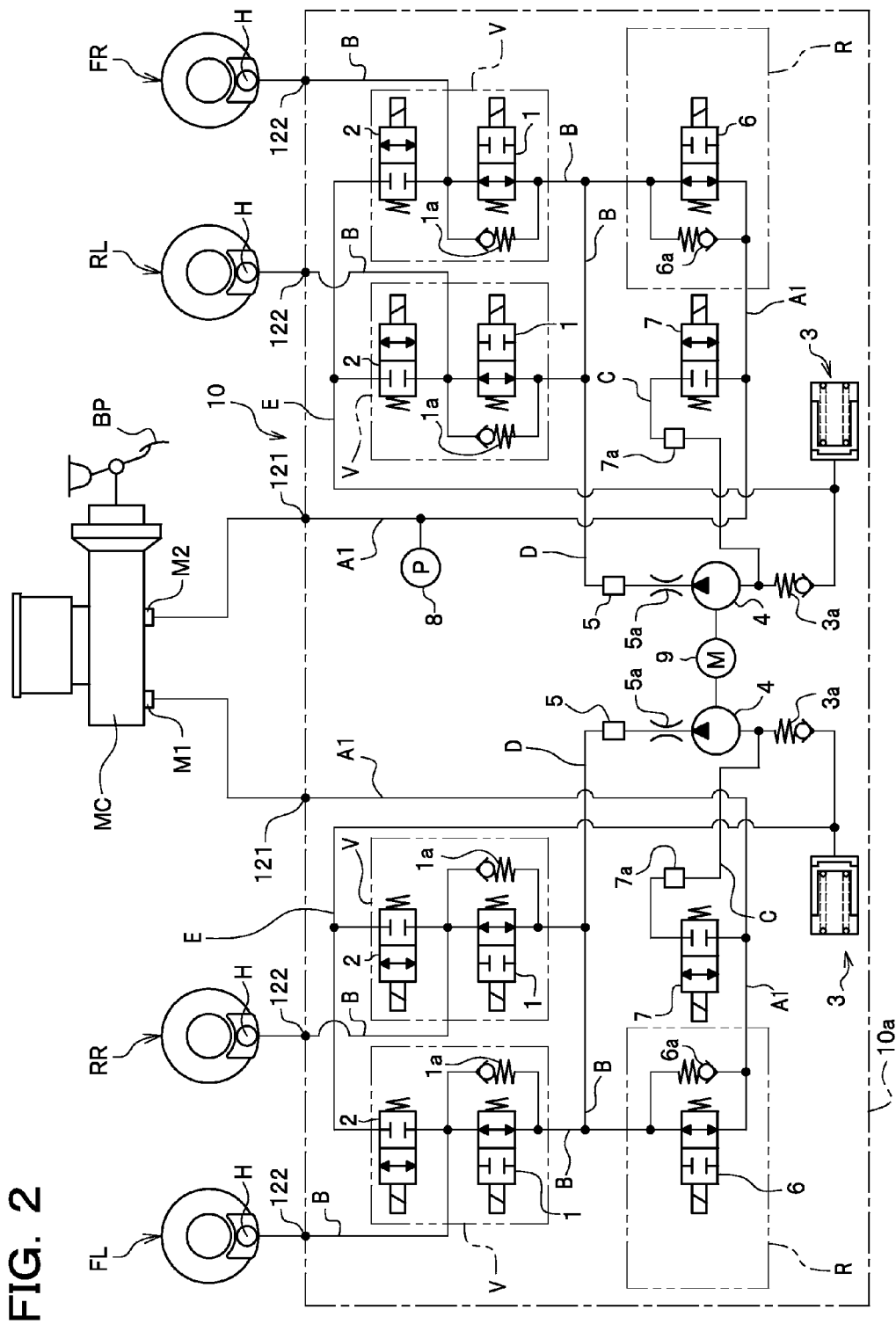
FIG. 2 is a diagram showing a brake fluid circuit of the brake fluid pressure control apparatus.

As seen in FIG. 2, the fluid pressure unit 10 of the brake fluid pressure control apparatus 100 is arranged between the master cylinder MC at which brake fluid pressure in accordance with the driver's brake pedal depression force is generated and the wheel brakes FR, FL, RR, RL. The fluid pressure unit 10 includes a pump body 10a which is a base body having brake fluid passages for brake fluid, a plurality of inlet valves 1 and outlet valves 2 arranged on the brake fluid passages, etc. Two input ports M1, M2 of the master cylinder MC are connected to two input ports 121, 121 of the pump body 10a, and two output ports 122, 122 of the pump body 10a are connected to the wheel brakes FR, FL, RR, RL. Normally, the brake fluid passages from the input ports 121, 121 to the output ports 122, 122 within the pump body 10a provide a fluid communication so that when the driver depresses the brake pedal BP, the brake pedal depression force is transmitted to the wheel brakes FL, RR, RL, FR.

Herein, the brake fluid passage extending from the output port M1 to the wheel brake FL at the front left wheel and the wheel brake RR at the rear right wheel is referred to as a "first brake system", whereas the brake fluid passage extending from the output port M2 to the wheel brake FR at the front right wheel and the wheel brake RL at the rear left wheel is referred to as a "second brake system".

The fluid pressure unit 10 includes two control valves V in the first brake system intended to the wheel brakes FL, RR, and similarly two control valves V in the second brake system intended to the wheel brakes RL, FR. In this fluid pressure unit 10, each of the first and second brake systems includes a reservoir 3, a pump 4, a dumper 5, an orifice 5a, a pressure regulating valve (regulator) R, a suction valve 7, and a fluid pool 7a. Further, the fluid pressure unit 10 includes a motor 9 for driving both the pump 4 in the first brake system and the pump 4 in the second brake system. The motor 9 is of a speed control type, and according to this preferred embodiment, the rotation speed of the motor 9 is controlled by PWM (Pulse Width Modulation) control. Further, in this preferred embodiment, a pressure sensor 8 is provided only on the second brake system.

In the following description, the brake fluid passage extending from the output port M1, M2 of the master cylinder MC to each pressure regulating valve R is referred to as an output fluid pressure passage A1, and the brake fluid passage extending from the pressure regulating valve R in the first brake system to the wheel brakes FL, RR and the brake fluid passage extending from the pressure regulating valve R in the second brake system to the wheel brakes RL, FR are both referred to as a wheel fluid pressure passage B. The brake fluid passage extending from the output fluid pressure passage A1 to the pump 4 is referred to as a suction fluid pressure passage C, the brake fluid passage extending from the pump 4 to the wheel fluid pressure passage B is referred to as a discharge fluid pressure passage D, and the brake fluid passage extending from the wheel fluid pressure passage B to the suction fluid pressure passage C is referred to as a release passage E.

The control valve V controls a flow of fluid from the master cylinder MC or the pump 4 to the wheel brakes FL, RR, RL, FR (specifically, the wheel cylinders H) and vise versa, so that the pressure within the wheel cylinder H can be increased or decreased. The control valve V includes an inlet valve 1, an outlet valve 2, and a check valve 1a for that purpose.

The inlet valve 1 is a normally open solenoid valve provided on the brake fluid passage between each of the wheel brakes FL, RR, RL, FR and the master cylinder MC, namely on the wheel fluid pressure passage B. The inlet valve 1 is normally open to allow transmission of brake fluid pressure from the master cylinder MC to each wheel brake FL, FR, RL, RR. However, if the wheel W is almost locked, the inlet valve 1 is closed under control of the controller 20 to shut off the transmission of brake fluid pressure from the brake pedal BP to each wheel brake FL, FR, RL, RR.

The outlet valve 2 is a normally closed solenoid valve provided on the brake fluid passage between each of the wheel brakes FL, RR, RL, FR and the reservoir 3, namely between the wheel fluid pressure passage B and the release passage E. The outlet valve 2 is normally closed. However, if the wheel W is almost locked, the outlet valve 2 is opened under control of the controller 20 to release the brake fluid pressure acting on each wheel brake FL, FR, RL, RR to each reservoir 3.

The check valve 1a is connected in parallel to each inlet valve 1. The check valve 1a only allows a flow of brake fluid from each wheel brake FL, FR, RL, RR to the master cylinder MC. When the brake pedal depression force is released at the brake pedal BP, even if the inlet valve 1 is closed, the check valve 1a allows a flow of brake fluid from each wheel brake FL, FR, RL, RR to the master cylinder MC.

The reservoir 3 is provided on the release passage E, and when each outlet valve 2 is released, brake fluid released from the outlet valve 2 flows into the reservoir 3 to absorb brake fluid pressure. A check valve 3a is provided between the reservoir 3 and the pump 4 which only allows a flow of brake fluid from the reservoir 3 to the pump 4.

The pump 4 is provided between the suction fluid pressure passage C in communication with the output fluid pressure passage A1 and the discharge fluid pressure passage D in communication with the wheel fluid pressure passage B. The pump 4 sucks and pressurizes brake fluid stored in the reservoir 3 and feeds the pressurized brake fluid to the discharge fluid pressure passage D. Therefore, the pump 4 returns the brake fluid stored in the reservoir 3 to the master cylinder MC as well as generates brake fluid pressure without requiring the brake pedal operation as described later so that a braking force is generated at the wheel brake FL, FR, RL, RR.

The pump 4 discharges brake fluid at a predetermined discharge rate which depends on the rotation speed (duty cycle) of the motor 9. To be more specific, the pump 4 discharges brake fluid at a greater discharge rate as the rotation speed (duty cycle) of the motor 9 increases.

The dumper 5 and the orifice 5a operate together to attenuate pressure pulsation of the brake fluid discharged from the pump 4 as well as to attenuate pulsation generated upon actuation of the pressure regulating valve R to be described later.

The pressure regulating valve R normally allows a flow of brake fluid from the output fluid pressure passage A1 to the wheel fluid pressure passage B. However, when the fluid pressure within the wheel cylinder H is to be increased using the brake fluid pressure generated at the pump 4, the pressure regulating valve R shuts off the flow of brake fluid and regulates fluid pressure in the wheel fluid pressure passage B and fluid pressure at the wheel cylinder H to be equal to or lower than a setting value. The pressure regulating valve R includes a changeover valve 6 and a check valve 6a.

The changeover valve 6 is a normally open linear solenoid valve provided between the output fluid pressure passage A1 in communication with the master cylinder MC and the wheel fluid pressure passage B in communication with each wheel brake FL, FR, RL, RR. Although not shown in detail, the valve element of the changeover valve 6 is urged toward the wheel fluid pressure passage B and the wheel cylinder H by an electromagnetic force in accordance with an electric current applied under control of the controller 20. When the fluid pressure in the wheel fluid pressure passage B becomes higher by a predetermined value (the value being determined based on the applied electric current) than the fluid pressure in the output fluid pressure passage A1, brake fluid flows from the wheel fluid pressure passage B to the output fluid pressure passage A1 through the changeover valve 6, so that the fluid pressure within the wheel fluid pressure passage B is adjusted to a predetermined pressure.

An electric current applied to the changeover valve 6 is controlled by PWM control.

The check valve 6a is connected in parallel to each changeover valve 6. The check valve 6a is a one-way valve for allowing a flow of brake fluid from the output fluid pressure passage A1 to the wheel fluid pressure passage B.

The suction valve 7 is a normally closed solenoid valve provided on the suction fluid pressure passage C so as to switch between a state where the suction fluid pressure passage C is opened and a state where the suction fluid pressure passage C is closed. The suction valve 7 is released (open) under control of the controller 20 when the changeover valve 6 is closed, that is, when brake fluid pressure is to be applied to each wheel brake FL, FR, RL, RR while the brake pedal BP is not operated.

The fluid pool 7a is provided on the suction fluid pressure passage C between the pump 4 and the suction valve 7. The fluid pool 7a stores brake fluid, so that the capacity for storing brake fluid in the suction fluid pressure passage C is substantially increased.

The pressure sensor 8 detects brake fluid pressure in the output fluid pressure passage A1. Detection results are input from the pressure sensor 8 to the controller 20.

Figure 3:
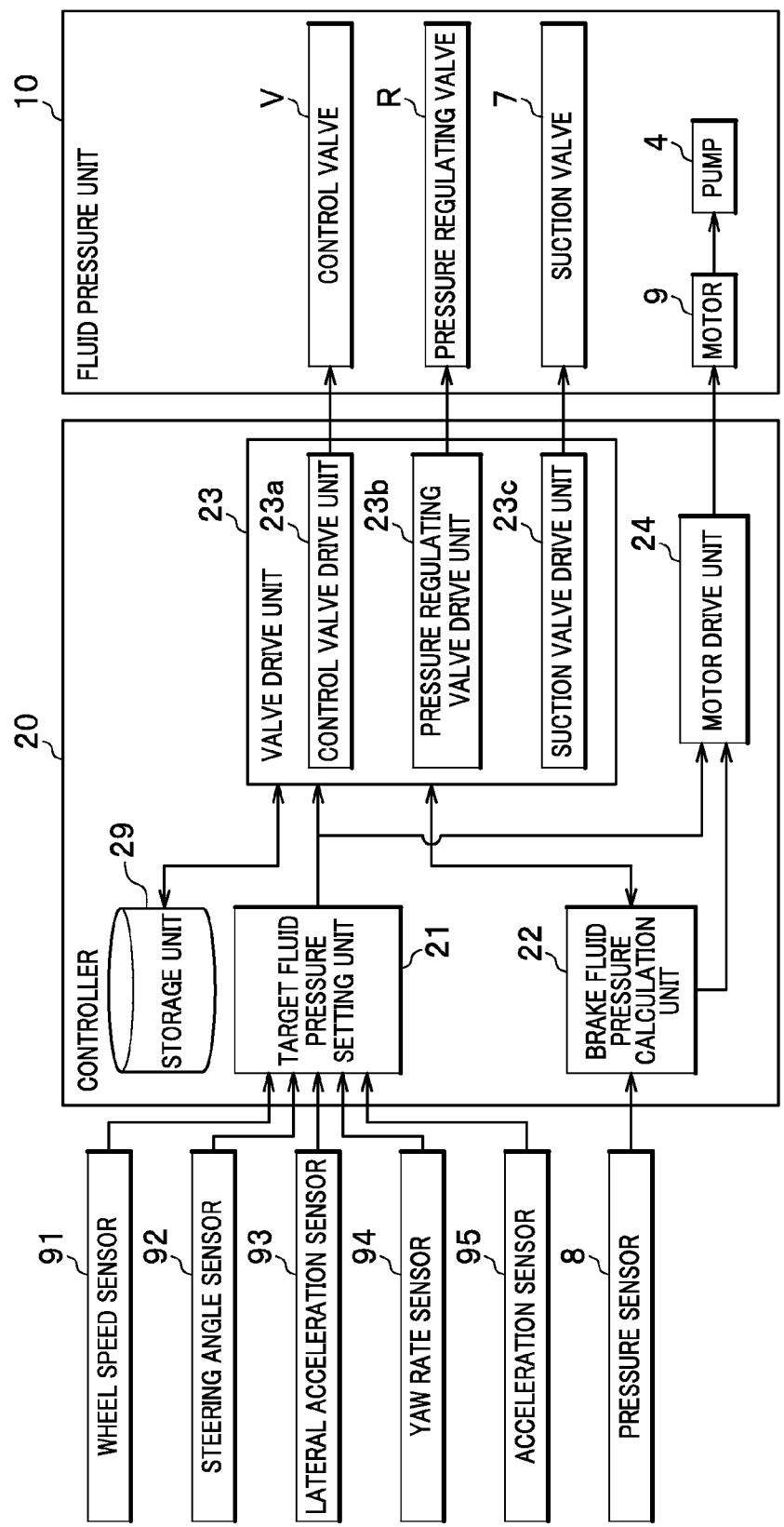
FIG. 3 is a block diagram of the controller.

As seen in FIG. 3, the controller 20 controls the opening/closing operations of the control valve V, the changeover valve 6, and the suction valve 7 in the fluid pressure unit 10 as well as the operation of the motor 9 based on the input signals from the sensors 91-95, to thereby control the operation of each wheel brake FL, FR, RL, FR. The controller 20 includes as functional units a target fluid pressure setting unit 21, a brake fluid pressure calculation unit 22, a valve drive unit 23, a motor drive unit 24, and a storage unit 29.

The target fluid pressure setting unit 21 selects a control logic based on the input signals from the sensors 91-95, and sets a target fluid pressure for each wheel brake FL, RR, RL, FR in accordance with the selected control logic. The manner of setting the target fluid pressure is not limited to a particular method, and any conventional method may be used.

As an example for setting the target fluid pressure, vehicle speed is first calculated from the wheel speed of each wheel (four wheels) W, followed by calculation of slip ratio from the wheel speeds and the vehicle speed. Further, a resultant acceleration is calculated based on a lateral acceleration and an acceleration of the vehicle CR in the front-back direction, and a road surface friction coefficient is estimated from the resultant acceleration. Therefore, the target fluid pressure for each wheel brake FL, RR, RL, FR can be set based on this friction coefficient, the slip ratio, and the current brake fluid pressure in each wheel cylinder H.

As another example for setting the target fluid pressure, the vehicle CR may be equipped with a millimeter-wave radar to obtain a vehicle-to-vehicle distance from the car in front so that when the vehicle-to-vehicle distance becomes smaller, an automatic brake is applied without requiring the driver's brake pedal operation in order to mitigate a collision damage. In this instance, the target fluid pressure may be set to increase gradually.

The target fluid pressure setting unit 21 compares the target fluid pressures of the wheel brakes FL, RR, RL, FR in the same brake system, and sets the highest target fluid pressure as the target fluid pressure for the wheel cylinders H in this brake system. To be more specific, the target fluid pressure setting unit 21 compares the target fluid pressure for the wheel brake FL and the target fluid pressure for the wheel brake RR in the first brake system, and sets the higher target fluid pressure as the target fluid pressure for the wheel brakes FL, RR in the first brake system. Similarly, the target fluid pressure setting unit 21 compares the target fluid pressure for the wheel brake RL and the target fluid pressure for the wheel brake FR in the second brake system, and sets the higher target fluid pressure as the target fluid pressure for the wheel brakes RL, FR in the second brake system. In principle, an electric current applied to the changeover valve 6, that is, the duty cycle is determined in accordance with the target fluid pressure.

The target fluid pressure set as above is input to the valve drive unit 23 and the motor drive unit 24.

The brake fluid pressure calculation unit 22 calculates the brake fluid pressure (estimated brake fluid pressure) of each wheel brake FL, RR, RL, FR based on the brake fluid pressure detected by the pressure sensor 8, namely the fluid pressure in the master cylinder, and the driving amount of each solenoid valve 1, 2, 6 by the valve drive unit 23. The calculated brake fluid pressure is input to the valve drive unit 23 and the motor drive unit 24.

The valve drive unit 23 inputs pulse signals to the fluid pressure unit 10 for actuating the inlet valve 1, the outlet valve 2, the changeover valve 6, and the suction valve 7 in the fluid pressure unit 10 such that the brake fluid pressure in the wheel cylinder H of each wheel brake FL, RR, RL, FR matches to the target fluid pressure set by the target fluid pressure setting unit 21. These pulse signals are set in a manner such that, for example, the greater the difference between the current brake fluid pressure in the wheel cylinder H and the target fluid pressure, the more pulses are output.

The valve drive unit 23 determines whether or not each of the control valve V, the pressure regulating valve R, and the suction valve 7 is to be operated based on the target fluid pressure and the estimated brake fluid pressure, and drives these valves. The valve drive unit 23 includes a control valve drive unit 23a for driving the control valve V, a pressure regulating valve drive unit 23b for driving the pressure regulating valve R, and a suction valve drive unit 23c for driving the suction valve 7.

The control valve drive unit 23a obtains the difference between the target fluid pressure and the estimated brake fluid pressure calculated by the brake fluid pressure calculation unit 22, and does not apply an electric current either to the inlet valve 1 or to the outlet valve 2 in the case where the fluid pressure in the wheel cylinder H should be increased. Meanwhile, in the case where the fluid pressure in the wheel cylinder H should be decreased, the control valve drive unit 23a sends a pulse signal to each of the inlet valve 1 and the outlet valve 2. Therefore, the inlet valve 1 is closed and the outlet valve 2 is released so that the brake fluid retained in the wheel cylinder H is released from the outlet valve 2.

Figure 4:
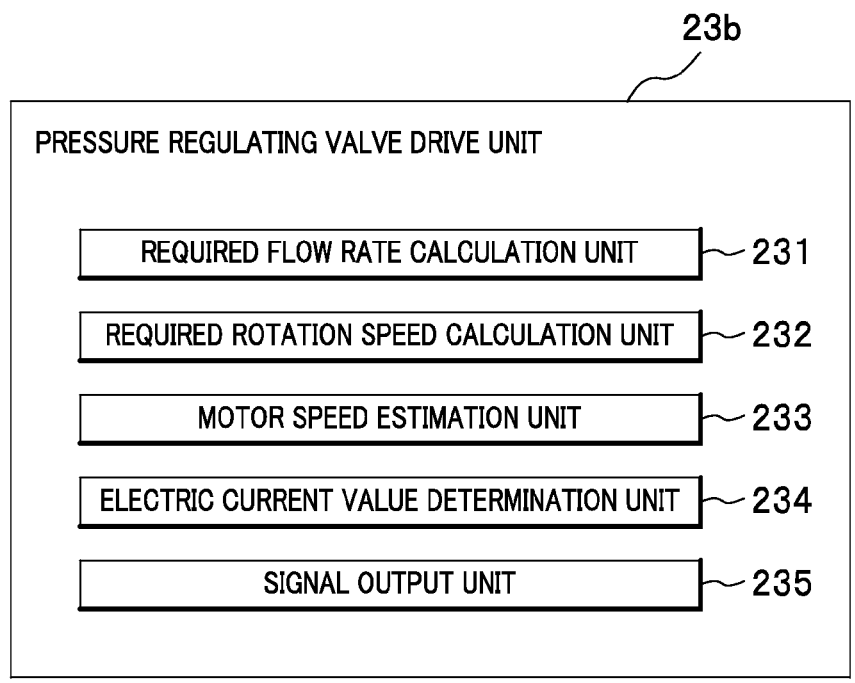
FIG. 4 is a block diagram illustrating detailed configuration of a pressure regulating valve driving unit which is a constituent of the controller.

As best seen in FIG. 4, the pressure regulating valve drive unit 23b includes a required flow rate calculation unit 231, a required rotation speed calculation unit 232, a motor speed estimation unit 233, an electric current value determination unit 234, and a signal output unit 235.

Figure 6:
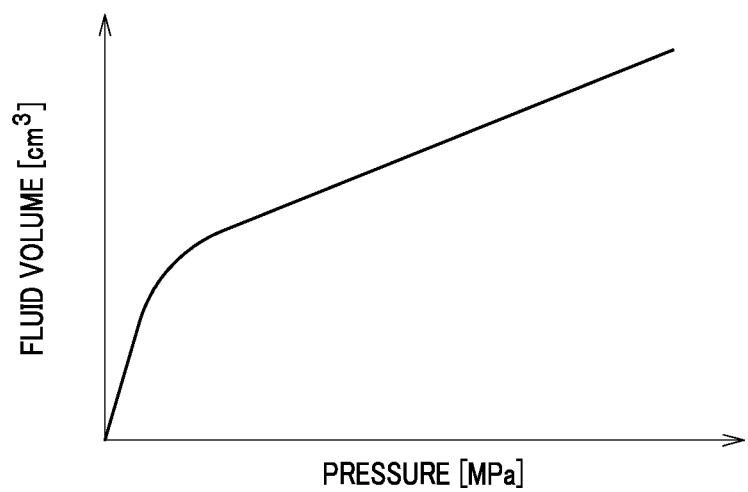
FIG. 6 is a map showing the relation between supplied fluid volume and pressure in the wheel cylinder.

The required flow rate calculation unit 231 calculates a required flow rate Fn from the target fluid pressure. The storage unit 29 stores a map showing the relation between pressure (fluid pressure) and fluid volume supplied to the wheel cylinder H, such as shown in FIG. 6. In FIG. 6, when the pressure (fluid pressure) is 0 (zero), no braking force acts on the wheel brake FR, FL, RR, RL. As the fluid volume supplied to the wheel cylinder H increases, the fluid pressure increases accordingly and a braking force acts on the wheel brake FR, FL, RR, RL. It is preferable that the relation between pressure (fluid pressure) and fluid volume is obtained in advance by experiments.

The required flow rate calculation unit 231 refers to this pressure-fluid volume map, and obtains the fluid volume M from the target fluid pressure. The required flow rate calculation unit 231 then calculates the difference $\Delta M$ between the current fluid volume $M_n$ which is obtained by the current process and the former fluid volume $M_{n-1}$ which is obtained by the former process, and divides the difference $\Delta M$ by the time interval (sampling time) between the former process and the current process to thereby obtain the required flow rate Fn. The calculated result is input to the required rotation speed calculation unit 232.

The required rotation speed calculation unit 232 calculates the required rotation speed VMn of the motor 9 from the required flow rate Fn.

The required rotation speed VMn is obtained by the following formula (1).

$$VMn\,[rpm] = \frac{60 \cdot Fn}{\pi r^2 \cdot s \cdot \zeta} \qquad (1)$$

where r is a plunger radius of the pump 4, s is a plunger stroke of the pump 4, and $\zeta$ is an efficiency of the pump 4.

The motor speed estimation unit 233 estimates an actual rotation speed of the motor 9 (actual motor speed VMa). The actual rotation speed VMa of the motor 9 is estimated, for example, by obtaining the terminal voltage of the motor 9 at the instant at which an electric current is not applied to the motor 9. Since the motor 9 is PWM controlled in this preferred embodiment, the terminal voltage can be obtained at the interval in which the electric current is OFF in the cycle of the PWM control. When an electric current is not applied to the motor 9, the motor 9 generates a counter electromotive force by the rotational movement. Therefore, the counter electromotive force appears on the terminal. The relation between counter electromotive force of the motor 9 and motor speed (actual rotation speed of the motor 9) is stored in the storage unit 29 in advance so that the motor speed can be estimated from the terminal voltage.

The electric current value determination unit 234 determines an electric current value of an electric current applied to the pressure regulating valve R, that is, duty cycle in this preferred embodiment.

Figure 5A:
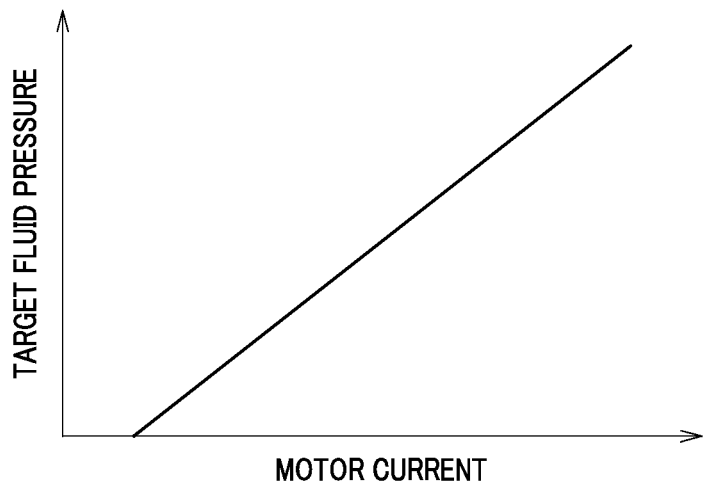
FIG. 5A is a map showing the relation between motor current and target fluid pressure.
Figure 5B:
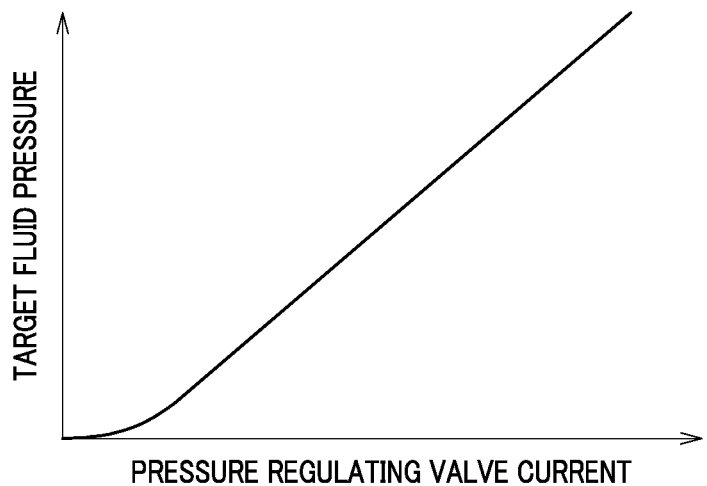
FIG. 5B is a map showing the relation between electric current applied to the pressure regulating valve and target fluid pressure.

In principle, the electric current value determination unit 234 determines an electric current value of the electric current applied to the pressure regulating valve R in accordance with the target fluid pressure that has been set by the target fluid pressure setting unit 21, and then determines the duty cycle based on this determined electric current value. For example, the storage unit 29 stores a map showing the relation between electric current applied to the pressure regulating valve R and target fluid pressure such as shown in FIG. 5B, and the electric current value determination unit 234 refers to this map to determine the electric current value of the electric current applied to the pressure regulating valve R, namely the duty cycle, from the target fluid pressure.

Further, the electric current value determination unit 234 increases the electric current value of the electric current applied to the pressure regulating valve R for a predetermined value when the required rotation speed VMn of the motor 9 exceeds the actual motor speed VMa. The predetermined value may be increased on a constant rate basis or by adding a constant value. However, this rate or value may not be constant. For example, this rate or value (predetermined value) may be greater as the difference between the actual motor speed VMa and the required rotation speed VMn is greater. If the difference between the actual motor speed VMa and the required rotation seed VMn is greater, it is necessary to restrict a flow of brake fluid as little as possible from the wheel cylinder H to the master cylinder MC through the pressure regulating valve R. Increasing the electric current for the predetermined value as above allows brake fluid pressure to be increased more quickly at the wheel cylinder H.

Further, instead of multiplying a predetermined rate or adding a predetermined value, the predetermined value may be increased by changing the duty cycle of the electric current applied to the pressure regulating valve R to a higher value such as 100% or 90%.

According to this preferred embodiment, a current correction value is set as an example of increasing the predetermined value, and this current correction value is added to the electric current value of the electric current applied to the pressure regulating valve R that is determined from the target fluid pressure as described above.

The electric current value determination unit 234 adds the current correction value and finally determines the electric current value (duty cycle) of the electric current applied to the pressure regulating valve R. The duty cycle is input to the signal output unit 235.

The signal output unit 235 outputs a pulse signal to the pressure regulating valve R based on the duty cycle determined by the electric current value determination unit 234.

The suction valve drive unit 23c does not normally apply an electric current to the suction valve 7. However, in the case where the fluid pressure in the wheel cylinder H should be increased based on the target fluid pressure output from the target fluid pressure setting unit 21, and if the master cylinder pressure detected by the pressure sensor 8 is lower than the target fluid pressure, the suction valve drive unit 23c inputs a pulse signal to the suction valve 7 so as to carry out pressurization using the pump 4. By this operation of the suction valve drive unit 23c, the suction valve 7 is opened to allow a flow of brake fluid from the master cylinder MC to the pump 4.

The motor drive unit 24 determines the rotation speed of the motor 9 based on the target fluid pressure and the estimated brake fluid pressure, and drives the motor 9. In other words, the motor drive unit 24 drives the motor 9 based on the motor speed control. In this preferred embodiment, the motor drive unit 24 performs the motor speed control with the PWM control.

As an example, the motor drive unit 24 determines the motor speed in accordance with the target fluid pressure that is set by the target fluid pressure setting unit 21, and then determines the duty cycle from this motor speed. For example, the storage unit 29 stores a map showing the relation between motor current and target fluid pressure such as shown in FIG. 5A, and the motor drive unit 24 refers to this map to determine the electric current value of the electric current applied to the motor 9, namely the duty cycle, from the target fluid pressure.

The operation of the brake fluid pressure control apparatus 100 as constructed above will be described mainly with reference to the characterizing features of the present invention.

The controller 20 repeats a series of operations from START to END in accordance with the flow chart of FIG. 7.

At first, during the running of the vehicle CR, the target fluid pressure setting unit 21 determines whether to start a vehicle behavior control, an automatic brake control for mitigating collision damage, or an antilock brake control for preventing the wheel brakes FL, RR, RL, FR from being locked, based on the detection results of the sensors 91-95, and sets the target fluid pressure (S101).

Based on the master cylinder pressure detected by the pressure sensor 8 and the former driving amount of each solenoid valve 1, 2, 6 driven by the valve drive unit 23, the brake fluid pressure calculation unit 22 calculates the brake fluid pressure (estimated brake fluid pressure) at each wheel brake FL, RR, RL, FR (S102).

The required flow rate calculation unit 231 in the pressure regulating valve drive unit 23b then refers to the pressure-fluid volume map, and converts the target fluid pressure into the fluid volume M (S103). The required flow rate calculation unit 231 then calculates the difference $\Delta M$ between the current fluid volume $M_n$ which is obtained by the current process and the former fluid volume $M_{n-1}$ which is obtained by the former process (S104). Further, the required flow rate calculation unit 231 calculates the required flow rate Fn by dividing the difference $\Delta M$ by the sampling time (S105).

The required rotation speed calculation unit 232 calculates the required rotation speed VMn of the motor 9 in accordance with the formula (1) as described above (S106).

The motor speed estimation unit 233 then obtains the terminal voltage of the motor 9 at the instant at which an electric current is not applied to the motor 9, and based on the relation between terminal voltage and motor speed estimates the actual rotation speed VMa of the motor 9 (S107).

Next, the electric current value determination unit 234 compares the required rotation speed VMn of the motor 9 and the actual rotation speed VMa of the motor 9. If the required rotation speed VMn is equal to or less than the actual rotation speed VMa (S108; No), the electric current value determination unit 234 determines and adds the current correction value of zero (S109). Meanwhile, if the required rotation speed VMn is greater than the actual rotation speed VMa (S108; Yes), the electric current value determination unit 234 sets the current correction value, for example, in accordance with the difference between the required rotation speed VMn and the actual rotation speed VMa (S110). Namely, the greater the difference between the required rotation speed VMn and the actual rotation speed VMa, the greater current correction value is set.

Further, the electric current value determination unit 234 refers to the map showing the relation between target fluid pressure and electric current applied to the pressure regulating valve R such as shown in FIG. 5B, and sets the reference electric current value supplied to the pressure regulating valve R from the target fluid pressure (S111). The electric current value determination unit 234 corrects the electric current value of the electric current applied to the pressure regulating valve R by adding the current correction value set in step S109 or step S110 to the reference electric current value, and sets the obtained corrected electric current value as an electric current value of the electric current that is actually applied to the pressure regulating valve R (S112).

The control valve drive unit 23a drives the control valve V, and the suction valve drive unit 23c drives the suction valve 7 (S113). To be more specific, according to whether the brake fluid pressure should be increased, decreased or retained in consideration of the target fluid pressure and the estimated brake fluid pressure, and according to whether or not the pump 4 is required to pressurize the brake fluid, the control valve drive unit 23a drives the control valve V, and the suction valve drive unit 23c drives the suction valve 7.

The signal output unit 235 in the pressure regulating valve drive unit 23b outputs a signal for driving the pressure regulating valve R to the pressure regulating valve R based on the duty cycle determined by the previous process (S114).

According to the above process, even if the target fluid pressure is gently increased such as in the case of an automatic brake control for mitigating collision damage, the brake fluid pressure control apparatus 100 quickly increases fluid pressure in the wheel cylinder H to perform a control in conformity with the target fluid pressure. This is because the electric current value of the electric current applied to the pressure regulating valve R is increased to a predetermined value when the required rotation speed VMn exceeds the actual rotation speed VMa, so that less amount of brake fluid flows through the pressure regulating valve R toward the master cylinder MC.

With reference to the time charts of FIGS. 8A, 8B and 9, processes of controlling brake fluid pressure will be described. Of these time charts, FIGS. 8A and 8B explain reference examples where the motor is PWM controlled without correction of electric current value made by the present invention, and FIG. 9 explains an example according to the present invention.

Referring to FIGS. 8A and 8B, description will be first given of a case in which the brake fluid pressure control apparatus increases brake fluid pressure. Values of pressures (the target fluid pressure and the actual fluid pressure at the wheel cylinder) are plotted in FIGS. 8A and 8B. The brake fluid pressure control apparatus is equipped with a brake fluid circuit substantially identical with that shown in FIG. 2; however, an electric current is applied to the pressure regulating valve R in accordance with the magnitude of the target fluid pressure and without correction of the electric current made by the present invention.

As seen in FIG. 8B, when the motor 9 is driven with an electric current at a duty cycle lower than 100%, the increase in the actual fluid pressure is delayed with respect to the target fluid pressure at both intervals from t1 to t2 and from t3 to t4. It requires ΔT2 to increase the pressure from P1 to P2.

As seen in FIG. 8A, when the motor 9 is driven with an electric current at 100% duty cycle, namely, when the motor 9 is driven at a higher rotation speed than in the case shown in FIG. 8B, the increase in the actual fluid pressure is further delayed with respect to the target fluid pressure at both intervals from t1 to t2 and from t3 to t4. It requires ΔT1 that is longer than ΔT2 to increase the pressure from P1 to P2.

This shows the fact that even if the motor 9 is driven at high speeds, brake fluid pressure does not increase quickly because brake fluid escapes to the master cylinder MC through the pressure regulating valve R. In other words, if an electric current value of the electric current applied to the pressure regulating valve R is smaller, less valve closing force is generated and the valve opening amount of the pressure regulating valve R increases accordingly. Therefore, even if the motor 9 is driven at high speeds, brake fluid pressure does not increase effectively.

According to the above embodiment, a control is made by correcting an electric current applied to the pressure regulating valve R. As seen in FIG. 9 and particularly to the time chart (c), the actual rotation speed VMa of the motor 9 does not substantially change in a short period of time as illustrated in the figure; however, the required rotation speed VMn that is obtained by calculation changes to a greater extent in accordance with a change in the target fluid pressure. The required rotation speed VMn is rapidly increased during the intervals from t1 to t2 and from t3 to t4 at which the target fluid pressure is also increased rapidly, and the required rotation speed VMn of the motor exceeds the actual rotation speed VMa of the motor 9. The instance where the required rotation speed VMn increases rapidly to exceed the actual rotation speed VMa is considered that all the brake fluid pumped by the pump 4 should be supplied to the wheel cylinder H. Therefore, as seen in the time chart (a) of FIG. 9, an electric current applied to the pressure regulating valve R is corrected by increasing the electric current for a predetermined value. This allows the pressure regulating valve R to be closed with a strong valve closing force so that brake fluid fed by the pump 4 is stored in the brake fluid passage between the pressure regulating valve R and the wheel cylinder H. Therefore, the fluid pressure in the wheel cylinder H increases effectively.

Figure 9:
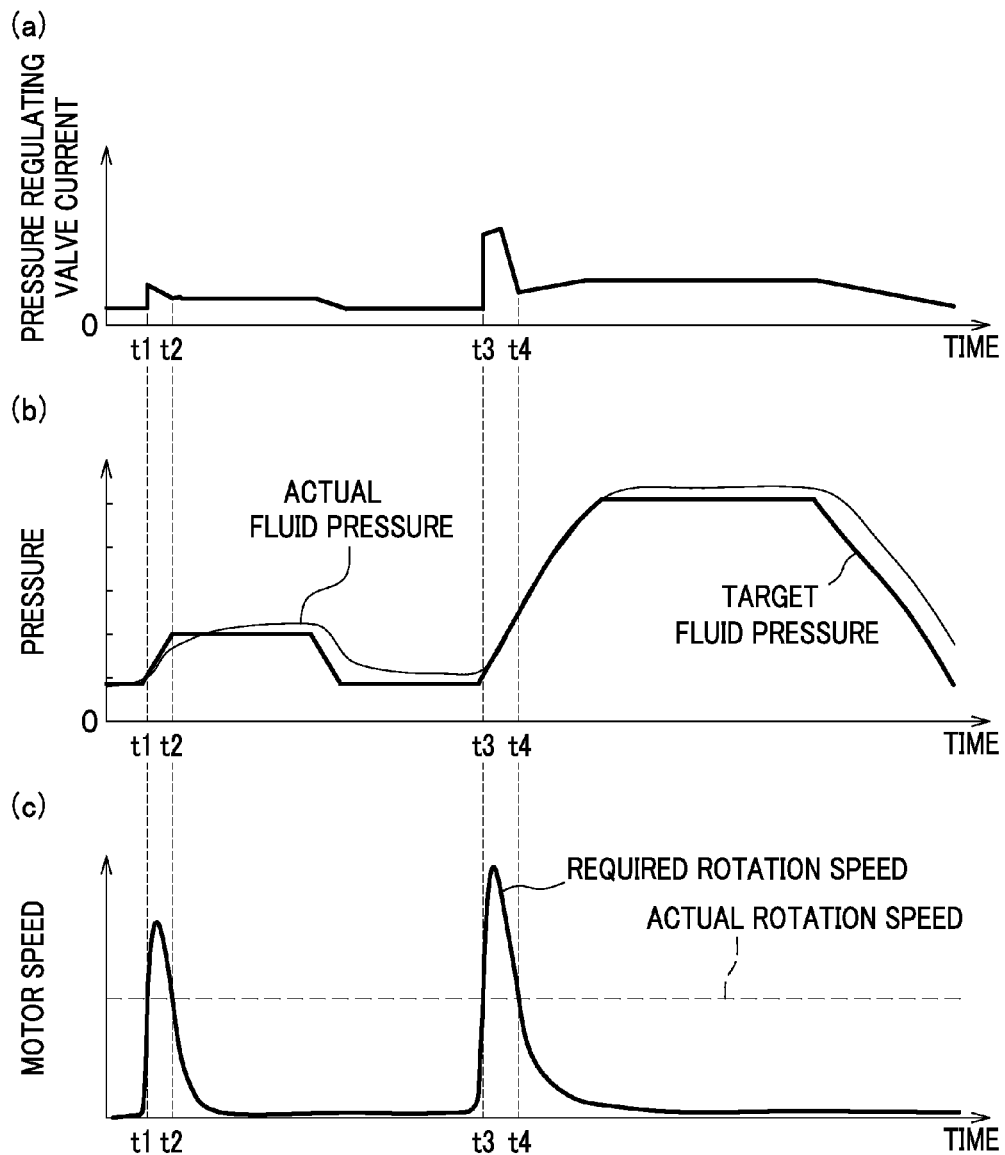
FIG. 9 is a time chart explaining a control of the brake fluid pressure control apparatus according to the present invention, in which (a) shows a change in electric current applied to the pressure regulating valve, (b) shows a change in fluid pressure at the wheel brake, and (c) shows a change in motor speed.

As seen in the time chart (b) of FIG. 9, when compared with the instances as explained in FIGS. 8A and 8B above, the brake fluid pressure control apparatus 100 according to the preferred embodiment can control brake fluid pressure such that the actual fluid pressure matches more closely to the target fluid pressure.

According to the brake fluid pressure control apparatus 100 as described above, even if the target fluid pressure is gently increased such as in the case of an automatic brake control for mitigating collision damage, the required rotation speed VMn of the motor 9 is calculated and an electric current value of the electric current applied to the pressure regulating valve R is increased in the case where the required rotation speed VMn exceeds the actual rotation speed VMa. This allows an effective use of the brake fluid discharged from the pump 4, and consequently the brake fluid can be pressurized effectively in the brake fluid passage between the pressure regulating valve R and the wheel cylinder H. Meanwhile, in the case where the required rotation speed VMn does not exceed the actual rotation speed VMa, an electric current is supplied to the pressure regulating valve R in accordance with the target fluid pressure, which can prevent the actual fluid pressure from being increased too much. Therefore, the brake fluid pressure control apparatus 100 can control brake fluid pressure such that the actual fluid pressure matches to the target fluid pressure.

Although the present invention has been described in detail with reference to the above preferred embodiment, the present invention is not limited to the above specific embodiment and various changes and modifications may be made without departing from the scope of the appended claims.

For example, a fluid pressure source defined in the claims is not limited to the master cylinder MC which generates pressure by the driver's brake pedal operation. Further, the pressure regulating valve defined in the claims may be any conventional valve as long as it can prevent a flow of brake fluid through the valve from the wheel cylinder to the fluid pressure source.

In the above preferred embodiment, the actual rotation speed VMa of the motor 9 is estimated from the terminal voltage of the motor 9. However, a rotation speed sensor may be provided on the motor 9 so that the detected rotation speed of the motor 9 is used as the actual rotation speed VMa of the motor 9.

According to the above preferred embodiment, an electric current applied to the pressure regulating valve is increased for a predetermined value when the required rotation speed VMn of the motor 9 exceeds the actual rotation speed VMa of the motor 9. The manner of determining the required rotation speed VMn is not limited to the specific embodiment as described above in the preferred embodiment. For example, in order to adjust to desirable characteristics of an actual vehicle, the required rotation speed VMn obtained by the calculation as described above may be multiplied by a constant value, or the required rotation speed VMn may be corrected by offsetting for a constant value.

What is claimed is:

1. A method of controlling braking force applied to a wheel of a vehicle using a brake fluid pressure control apparatus for a vehicle, the method comprising:
providing a fluid pressure passage extending from a fluid pressure source to a wheel brake;
providing a pressure regulating valve arranged on the fluid pressure passage, the pressure regulating valve allowing a flow of brake fluid from the fluid pressure source to the wheel brake while restricting a flow of brake fluid from the wheel brake to the fluid pressure source with a valve closing force according to an electric current applied to the valve, where an opening degree of the pressure regulating valve varies in a continuous range according to the valve closing force that is controlled based on an amount of the electric current applied to the valve;
providing a pump for feeding pressurized brake fluid to the fluid pressure passage between the pressure regulating valve and the wheel brake;
providing a motor for driving the pump; and
providing a controller which controls the electric current applied to the pressure regulating valve in accordance with a target fluid pressure for the wheel brake to control fluid pressure supplied to the wheel brake, wherein the controller
determines a first electric current value of the electric current applied to the pressure regulating valve in accordance with a target fluid pressure for the wheel brake;
converts the target fluid pressure into fluid volume and calculates a required flow rate based on this fluid volume;
calculates a required rotation speed of the motor based on the required flow rate and on the basis of an efficiency (the pump's flow rate corresponding to the motor rotation speed) of the pump; and
increasing the first electric current applied to the pressure regulating valve to a predetermined electric current value to obtain a second electric current when the required rotation speed exceeds an actual rotation speed of the motor obtained through detection or estimation,
wherein a first electric current corresponding to the first electric current value is applied to the pressure regulating valve when the required rotation speed is not greater than the actual rotation speed of the motor, and a second electric current corresponding to the second electric current value is applied to the pressure regulating valve when the required rotation speed is greater than the actual rotation speed of the motor.

2. The method according to claim 1, wherein the controller sets the predetermined electric current value to a greater value as a difference between the actual rotation speed and the required rotation speed increases.

3. The method according to claim 1, wherein the required flow rate calculation is obtained by referring to a map showing the relation between fluid pressure and fluid volume in a wheel cylinder provided on the wheel brake to obtain the fluid volume from the target fluid pressure; calculating a difference value between a current fluid volume and a former fluid volume; and dividing the difference value by a sampling time from when the former fluid volume is obtained to when the current fluid volume is obtained to calculate the required flow rate.

4. The method according to claim 3, wherein the required rotation speed is obtained by the following formulae:

$$VMn\,[rpm] = \frac{60 \cdot Fn}{\pi r^2 \cdot s \cdot \zeta}$$

where VMn is the required rotation speed of the motor, Fn is the required flow rate, r is a plunger radius of the pump, s is a plunger stroke of the pump, and $\zeta$ is an efficiency of the pump.

5. The method according to claim 1, wherein the motor is controlled based on the target fluid pressure.

6. The method according to claim 1, wherein the predetermined electric current value is higher than that applied in a case in which the controller controls the electric current based on the target fluid pressure.

7. A brake fluid pressure control apparatus for a vehicle comprising:
a fluid pressure passage extending from a fluid pressure source to a wheel brake;
a pressure regulating valve arranged on the fluid pressure passage, the pressure regulating valve allowing a flow of brake fluid from the fluid pressure source to the wheel brake while restricting a flow of brake fluid from the wheel brake to the fluid pressure source with a valve closing force according to an electric current applied to the valve, where an opening degree of the pressure regulating valve varies in a continuous range according to the valve closing force that is controlled based on an amount of the electric current applied to the valve;
a pump for feeding pressurized brake fluid to the fluid pressure passage between the pressure regulating valve and the wheel brake;
a motor for driving the pump; and a controller which controls the pressure regulating valve to control fluid pressure supplied to the wheel brake, wherein the controller comprises means for determining a first electric current value of the electric current applied to the pressure regulating valve in accordance with a target fluid pressure for the wheel brake;

means for converting the target fluid pressure into fluid volume and calculate a required flow rate based on this fluid volume;

means for calculating a required rotation speed of the motor based on the required flow rate and on the basis of an efficiency (the pump's flow rate corresponding to the motor rotation speed) of the pump; and means for adding a predetermined electric current value to the first electric current value to obtain a second electric current value when the required rotation speed is greater than an actual rotation speed of the motor obtained through detection or estimation, and wherein a first electric current corresponding to the first electric current value is applied to the pressure regulating valve when the required rotation speed is not greater than the actual rotation speed of the motor, and a second electric current corresponding to the second electric current value is applied to the pressure regulating valve when the required rotation speed is greater than the actual rotation speed of the motor.

8. The brake fluid pressure control apparatus according to claim 7, wherein the controller converts the target fluid pressure into the fluid volume based on a relation between the fluid volume and the target fluid pressure, the relation indicating that a rate of change in the fluid volume to change in the target fluid pressure is greater in a first region where the target fluid pressure is smaller than a predetermined fluid pressure value than in a second region where the target fluid pressure is not smaller than the predetermined fluid pressure value.

9. The brake fluid pressure control apparatus according to claim 7, wherein the motor is controlled based on the target fluid pressure.

10. The brake fluid pressure control apparatus according to claim 7, wherein the controller sets the predetermined electric current value to a greater value as a difference between the actual rotation speed and the required rotation speed increases.

11. The brake fluid pressure control apparatus according to claim 8, wherein the required flow rate calculation is obtained by referring to a map showing the relation between fluid pressure and fluid volume in a wheel cylinder provided on the wheel brake to obtain the fluid volume from the target fluid pressure; calculating a difference value between a current fluid volume and a former fluid volume; and dividing the difference value by a sampling time from when the former fluid volume is obtained to when the current fluid volume is obtained to calculate the required flow rate.

12. The brake fluid pressure control apparatus according to claim 11, wherein the required rotation speed is obtained by the following formulae:

$$VMn[rpm] = \frac{60 \cdot Fn}{\pi r^2 \cdot s \cdot \zeta}$$

where VMn is the required rotation speed of the motor, Fn is the required flow rate, r is a plunger radius of the pump, s is a plunger stroke of the pump, and $\zeta$ is the efficiency of the pump.

13. The method according to claim 1, wherein the pump sucks and pressurizes brake fluid in a reservoir and returns the brake fluid stored in the reservoir to a master cylinder, wherein the brake fluid can flow from the reservoir backwards to the master cylinder.

14. The method according to claim 1, wherein the pressure regulating valve both:

calculates an additional amount of current to be applied to the pressure regulating valve based on a difference between the required rotation speed of the motor and the actual rotation speed of the motor; and increases the electric current applied to the pressure regulating valve by the additional amount of current when the required rotation speed exceeds an actual rotation speed of the motor obtained through detection or estimation to close the pressure regulating valve by an additional amount proportional to the difference between the required rotation speed of the motor and the actual rotation speed of the motor.

15. The brake fluid pressure control apparatus according to claim 7, wherein the pump sucks and pressurizes brake fluid in a reservoir and returns the brake fluid stored in the reservoir to a master cylinder, wherein the brake fluid can flow from the reservoir backwards to the master cylinder.

16. The brake fluid pressure control apparatus according to claim 7, wherein the pressure regulating valve both:

calculates an additional amount of current to be applied to the pressure regulating valve based on a difference between the required rotation speed of the motor and the actual rotation speed of the motor; and increases the electric current applied to the pressure regulating valve by the additional amount of current when the required rotation speed exceeds an actual rotation speed of the motor obtained through detection or estimation to close the pressure regulating valve by an additional amount proportional to the difference between the required rotation speed of the motor and the actual rotation speed of the motor.

* * * * *